United States Patent
Seagle et al.

(10) Patent No.: US 11,227,628 B1
(45) Date of Patent: Jan. 18, 2022

(54) RECESSED TAPE SERVO HEAD TO CREATE AN EQUIPOTENTIAL TAPE BEARING SURFACE

(71) Applicant: Western Digital Technologies, Inc., San Jose, CA (US)

(72) Inventors: David J. Seagle, Morgan Hill, CA (US); Quang Le, San Jose, CA (US); Zhanjie Li, Pleasanton, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/183,166

(22) Filed: Feb. 23, 2021

(51) Int. Cl.
*G11B 5/39* (2006.01)
*G11B 5/008* (2006.01)
*G11B 5/584* (2006.01)

(52) U.S. Cl.
CPC ........ *G11B 5/3912* (2013.01); *G11B 5/00813* (2013.01); *G11B 5/00821* (2013.01); *G11B 5/3906* (2013.01); *G11B 5/3909* (2013.01); *G11B 5/3948* (2013.01); *G11B 5/584* (2013.01)

(58) Field of Classification Search
None
See application file for complete search history.

(56) References Cited

U.S. PATENT DOCUMENTS

| 5,713,122 | A | 2/1998 | Aboaf et al. |
| 6,433,965 | B1 | 8/2002 | Gopinathan et al. |
| 8,081,398 | B2 * | 12/2011 | Hachisuka ......... G11B 5/00813 360/125.31 |
| 8,472,148 | B2 | 6/2013 | Brown et al. |
| 9,001,473 | B1 | 4/2015 | Gao et al. |
| 9,263,068 | B1 * | 2/2016 | Biskeborn ............ G11B 5/3909 |
| 9,269,383 | B1 | 2/2016 | Hattori et al. |
| 9,343,097 | B2 | 5/2016 | Biskeborn et al. |
| 9,747,931 | B1 | 8/2017 | Biskeborn et al. |
| 9,786,302 | B1 | 10/2017 | Brown et al. |
| 9,947,348 | B1 * | 4/2018 | Biskeborn ............ G11B 5/3929 |

(Continued)

OTHER PUBLICATIONS

International Search Report and the Written Opinion for International Application No. PCT/US2021/034544 dated Aug. 5, 2021, 13 pages.

(Continued)

*Primary Examiner* — Jefferson A Evans
(74) *Attorney, Agent, or Firm* — Patterson & Sheridan, LLP; Steven H. Versteeg

(57) ABSTRACT

The present disclosure generally relates to a tape drive comprising a tape head. The tape head comprises one or more data heads and one or more servo heads. Each servo head comprises a first shield, a first lead, a magnetoresistive sensor, a second lead, a second shield, and side shields. The magnetoresistive sensor is recessed from a media facing surface (MFS). The first lead is recessed from the MFS while the second lead and side shields are disposed at the MFS. A power supply is configured to apply a first electrical potential to the first and second shields, the side shields, and the second lead, and a second electrical potential to the first lead. The electrical design of each servo head is configured such that only one electric potential is exposed at the MFS, eliminating the possibility that a scratch will short the sensor.

20 Claims, 13 Drawing Sheets

(56) References Cited

U.S. PATENT DOCUMENTS

| | | | | |
|---|---|---|---|---|
| 9,990,944 | B1* | 6/2018 | Biskeborn | G11B 5/3932 |
| 10,014,014 | B1* | 7/2018 | Biskeborn | G11B 5/00826 |
| 10,803,889 | B2* | 10/2020 | Biskeborn | G11B 5/29 |
| 10,997,994 | B1* | 5/2021 | Seagle | G11B 5/3912 |
| 2007/0109681 | A1 | 5/2007 | Biskeborn et al. | |
| 2007/0230062 | A1* | 10/2007 | Maejima | G11B 5/3958 |
| | | | | 360/316 |
| 2016/0203836 | A1 | 7/2016 | Biskeborn et al. | |
| 2017/0294197 | A1 | 10/2017 | Brown et al. | |
| 2018/0137882 | A1 | 5/2018 | Biskeborn et al. | |
| 2018/0211684 | A1 | 7/2018 | Biskeborn et al. | |
| 2019/0180773 | A1 | 6/2019 | Biskeborn et al. | |
| 2019/0180779 | A1* | 6/2019 | Biskeborn | G11B 5/11 |
| 2019/0333536 | A1 | 10/2019 | Olson et al. | |
| 2021/0280211 | A1* | 9/2021 | Morita | G11B 5/78 |

OTHER PUBLICATIONS

Biskeborn, Robert G. et al., "TMR Tape Drive for a 15 TB Cartridge", IBM Corporations, System, pp. 1-21.
International Search Report and the Written Opinion for International Application No. PCT/US2021/034544 dated Nov. 12, 2021, 10 pages.

* cited by examiner

RECESSED TAPE SERVO HEAD TO CREATE AN EQUIPOTENTIAL TAPE BEARING SURFACE

BACKGROUND OF THE DISCLOSURE

Field of the Disclosure

Embodiments of the present disclosure generally relate to a tape head and a tape head drive including a tape head.

Description of the Related Art

Tape heads are used to record and read back information on tapes by magnetic processes. The tape head comprises servo elements and data elements that are arranged in an array that is oftentimes referred to as a tape head array. The tape contains servo tracks and data tracks. The tape head uses the servo elements to read the servo tracks on the tape to align the data elements relative to the tape.

The tape head array typically has two servo elements or servo heads that are disposed near an edge of the tape head array to align the data elements with the data tracks of the tape. When the servo elements are properly positioned on the tape servo tracks, the data heads are expected to properly align to the data tracks. The data heads make up a so-called "data head array" which is aligned to the servo heads during head manufacture using wafer level photolithography processes that can control the servo-to-data alignment within a few nanometers. Thus, if both servo heads are operating correctly, the data heads can be centered over the data tracks for both reading and writing. However, if one of the servo heads is damaged during use, the ability to align tape to head is compromised, affecting both the reader and the writer of each data head in the tape head array. The reader could misread the track or the writer could overwrite an adjacent track.

As shipped, the servo heads are first proven to work. However, after significant tape has moved passed the head, wear and scratching at a media facing surface (MFS) of the tape head can leave the servo head(s) nonfunctional. In a tunneling magnetoresistive (TMR) head, this problem is severe in that a movement of smeared metal across the 1 nm barrier layer of a TMR sensor may short out the signal from the TMR head to make the servo head nonfunctional. Generally, a hard overcoat is deposited on the MFS of the head array. However, in practice, wear of the overcoat or scratches from contaminating particles can expose the barrier layer, reducing the life of the tape head or TMR head.

Therefore, there is a need in the art for a tape head comprising servo heads with increased durability.

SUMMARY OF THE DISCLOSURE

The present disclosure generally relates to a tape drive comprising a tape head. The tape head comprises one or more data heads and one or more servo heads. Each servo head comprises a first shield, a first lead, a magnetoresistive sensor, a second lead, a second shield, and side shields. The magnetoresistive sensor is recessed from a media facing surface (MFS). The first lead is recessed from the MFS while the second lead and side shields are disposed at the MFS. A power supply is configured to apply a first electrical potential to the first and second shields, the side shields, and the second lead, and a second electrical potential to the first lead. The electrical design of each servo head is configured such that only one electric potential is exposed at the MFS, eliminating the possibility that a scratch will short the sensor.

In one embodiment, a tape head comprises one or more data heads and one or more servo heads. Each servo head comprises a first shield extending to a MFS, a first lead disposed over the first shield, a pinned layer disposed over the first lead, a magnetoresistive sensor disposed over the first pinned layer, the magnetoresistive sensor being recessed from the MFS a first distance, wherein the magnetoresistive sensor comprises a free layer, a second lead disposed over the magnetoresistive sensor, a spacer layer disposed over the second lead, a second shield disposed over the spacer layer, and side shields disposed adjacent to the magnetoresistive sensor between the first lead and the second lead, wherein the side shields are electrically connected to the free layer and electrically isolated from the pinned layer.

In another embodiment, a tape head comprises one or more data heads and one or more servo heads. Each servo head comprises a first shield extending to a MFS, a first dielectric spacer layer disposed over the first shield, a first lead disposed over the first dielectric spacer layer, the first lead extending to the MFS, wherein the first lead is connected to a power supply, a magnetoresistive sensor disposed over the first lead, the magnetoresistive sensor being recessed from the MFS a first distance, a second lead disposed over the magnetoresistive sensor, the second lead being recessed from the MFS, a second shield disposed over the second lead, the second lead connected to the power supply, and side shields disposed adjacent to the magnetoresistive sensor between the first lead and the second lead, wherein the power supply is configured to apply a first electrical potential to the first lead and to apply a second electrical potential to the second side shields and the second lead.

In yet another embodiment, a tape head comprises one or more data heads and one or more servo heads. Each servo head comprises a first shield extending to a MFS, a first lead disposed over the first shield, the first shield being recessed from the MFS, a TMR sensor disposed over the first lead, the TMR sensor comprising a free layer recessed from the MFS a first distance, a second lead disposed over the TMR sensor, the second lead extending to the MFS, a second shield disposed over the second lead, and side shields disposed adjacent to the TMR sensor between the first lead and the second lead. The tape head further comprises means for applying a first electrical potential to the second lead, the side shields, and the first and second shields, and for applying a second electrical potential to the first lead.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. Additionally, the relative position of one layer with respect to other layers is provided assuming operations are performed relative to a substrate without consideration of the absolute orientation of the substrate.

The present disclosure generally relates to a tape drive comprising a tape head. Each servo head comprises a first shield, a first lead, a magnetoresistive sensor, a second lead, a second shield, and side shields. The magnetoresistive sensor is recessed from a media facing surface (MFS). The first lead is recessed from the MFS while the second lead and side shields are disposed at the MFS. A power supply is configured to apply a first electrical potential to the first and second shields, the side shields, and the second lead, and a second electrical potential to the first lead. The electrical design of each servo head is configured such that only one electric potential is exposed at the MFS, eliminating the possibility that a scratch will short the sensor.

Figure 1A:
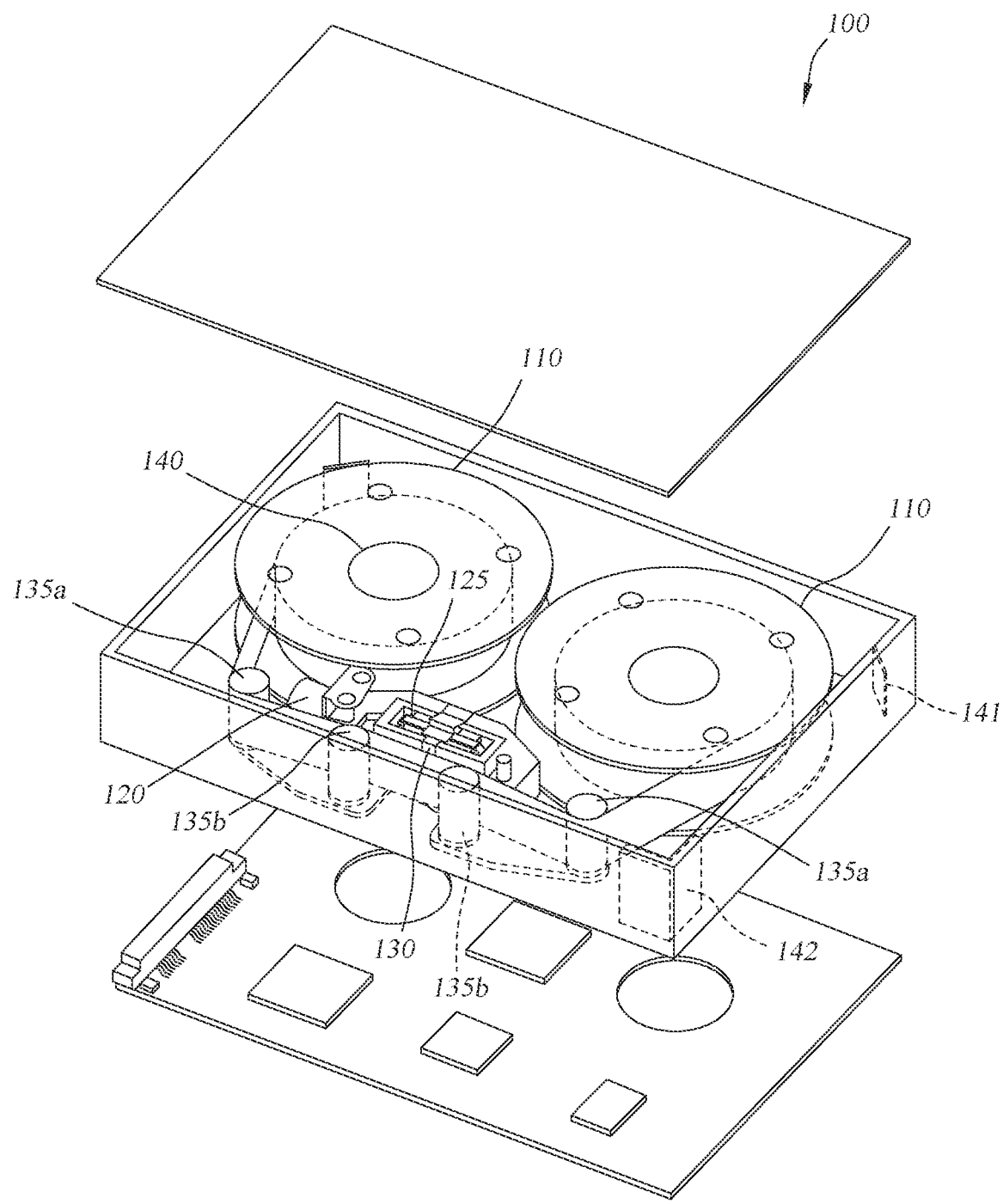
FIGS. 1A-1C illustrate a perspective exploded view and a simplified top down and side profile view of a tape embedded drive, in accordance with some embodiments.
Figure 1B:
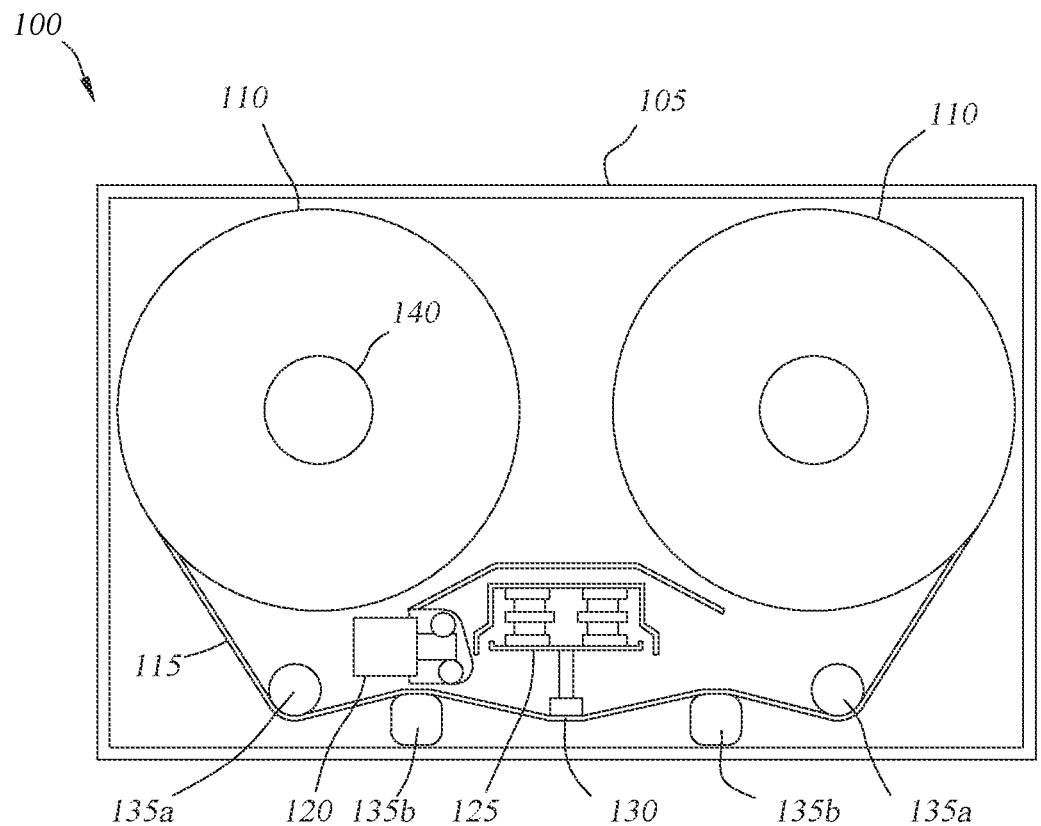
Figure 1C:
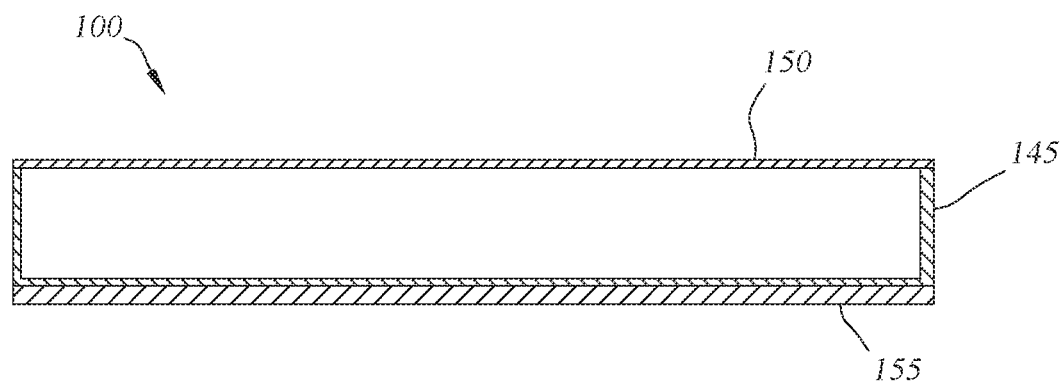

FIGS. 1A-1C illustrate a perspective exploded view and a simplified top down and side profile view of a tape embedded drive (TED) 100, in accordance with some embodiments. Focusing on FIG. 1B, for example, the tape embedded drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape embedded drive further comprises a printed circuit board assembly (PCBA). In an embodiment, most of the components are within an interior cavity of the casing, except the PCBA, which is mounted on an external surface of the casing. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing, with the center of the two tape reels 110 on the same level in the cavity and with the head assembly 130 located in the middle and below the two tape reels 110. Tape reel motors located in the spindles of the tape reels can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape embedded drive 100. In such embodiments, the tape embedded drive 100 may include magnetic media or tape media 115 from an insertable cassette or cartridge (e.g., an LTO drive), where the insertable cassette or cartridge further comprises one or more of the tape reels 110 as well. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels are biased against the guides/rollers 135a, 135b (collectively referred to as guides/rollers 135) and are movably passed along the head assembly 130 by movement of the reels. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor and stepping motor may variably position the tape head(s) transversely with respect to the width of the recording tape. The stepping motor may provide coarse movement, while the voice coil motor may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape embedded drive 100 within the casing. In particular, as the head mechanism is internal to the casing in certain embodiments, the tape media 115 may not be exposed to the outside of the casing, such as in conventional tape drives. Thus, the tape media 115 does not need to be routed along the edge of the casing and can be freely routed in more compact and/or otherwise more efficient ways within the casing. Similarly, the head(s) and tape reels may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA is made of solid state electronics, environmental issues are less of a concern, so it does not need to be placed inside the casing 105. That leaves room inside casing for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing.

In one embodiment, the cover 150 is used to hermetically seal the tape embedded drive. For example, the drive 100 may be hermetically sealed for environmental control by attaching (e.g., laser welding, adhesive, etc.) the cover to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

Figure 2:
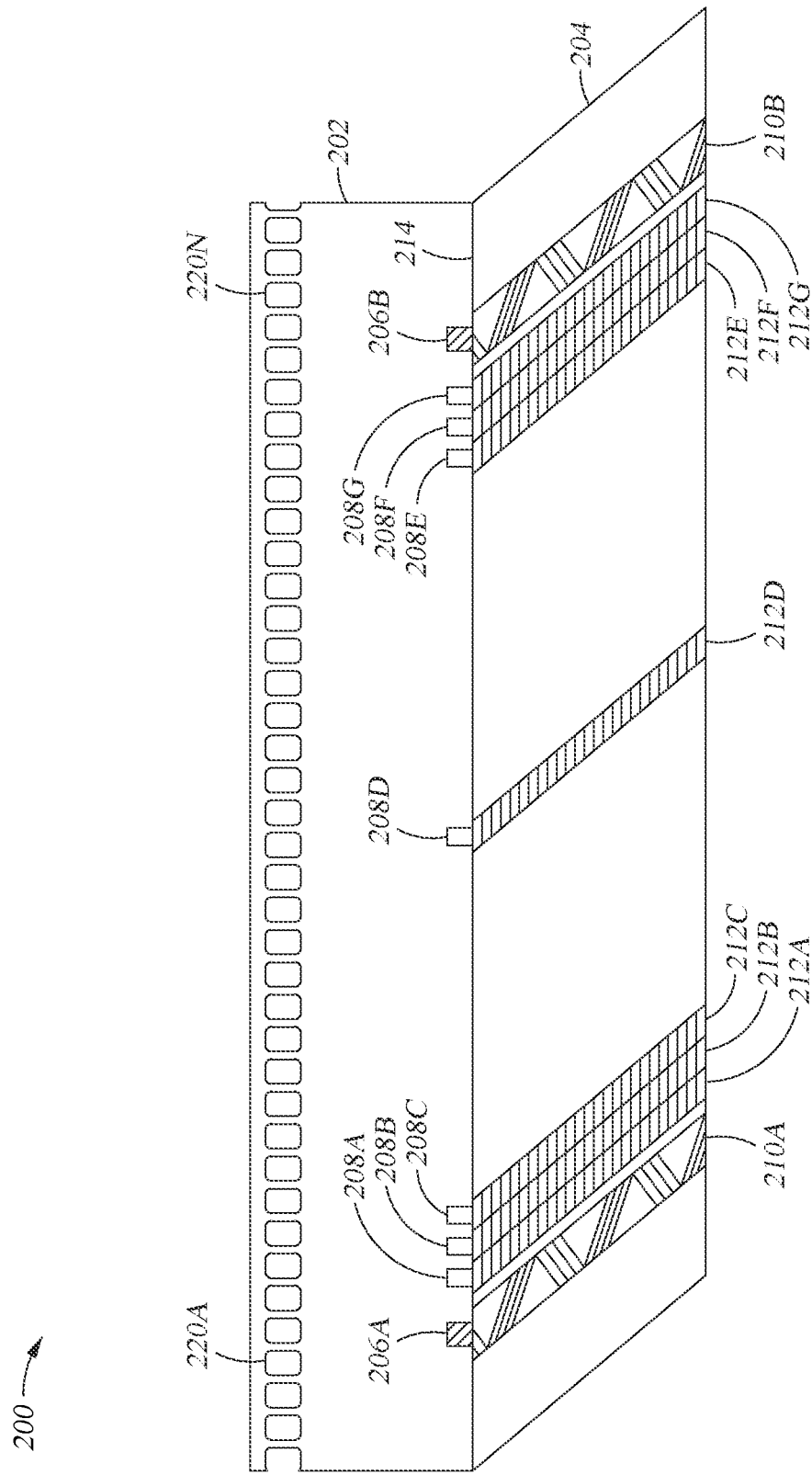
FIG. 2 is a schematic illustration of a tape head and tape that are aligned.

FIG. 2 is a schematic illustration of a tape head 200 and a tape 204 that are aligned. The tape head 200 comprises a tape head body 202 that is aligned with the tape 204. The tape 204 moves past the tape head 200 during read and/or write operations. The tape head 200 has a media facing surface (MFS) 214 that faces the tape 204.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data track (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
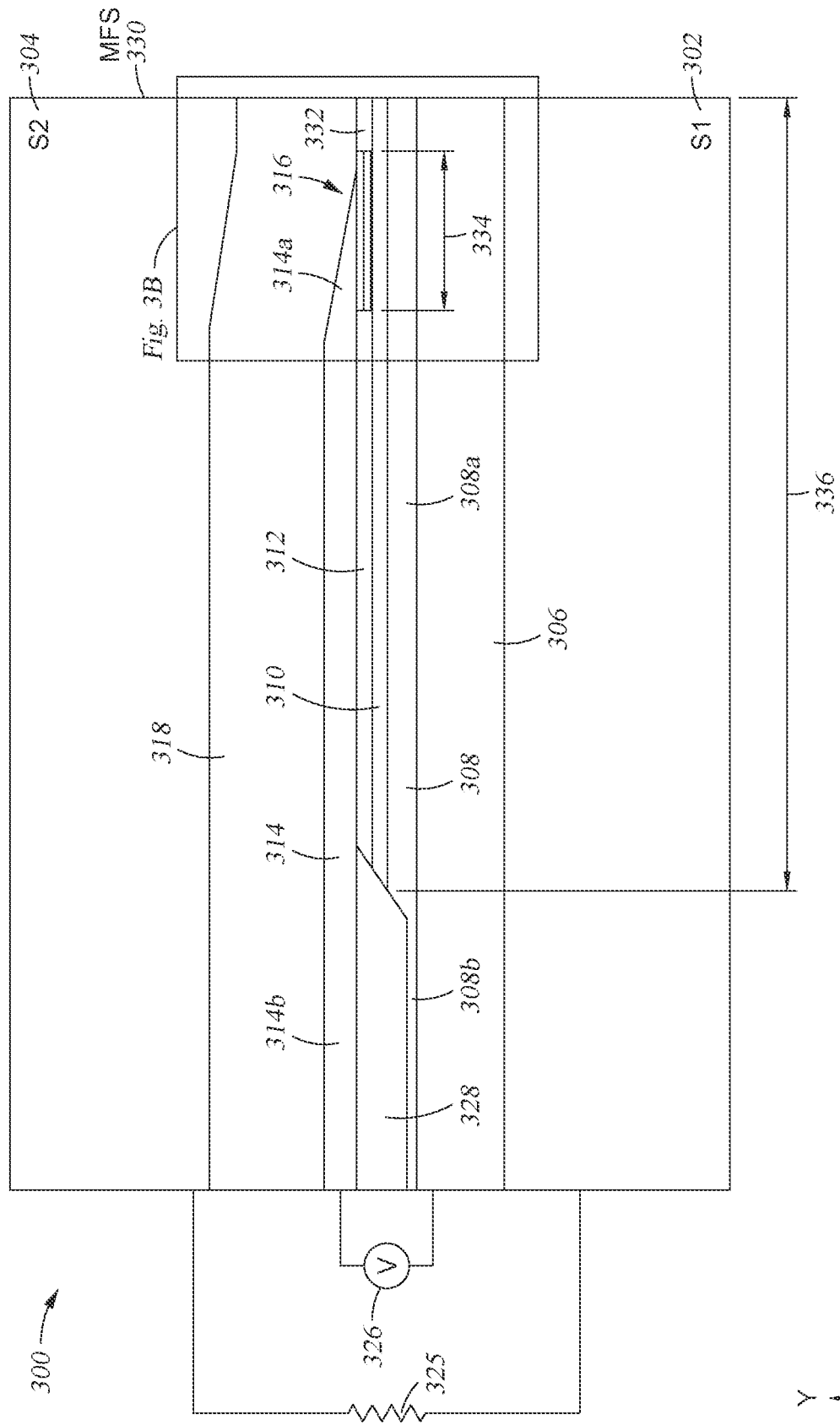
FIGS. 3A-3B illustrate cross-section views of a servo head comprising a recessed magnetoresistive sensor, according to various embodiments.
Figure 3B:
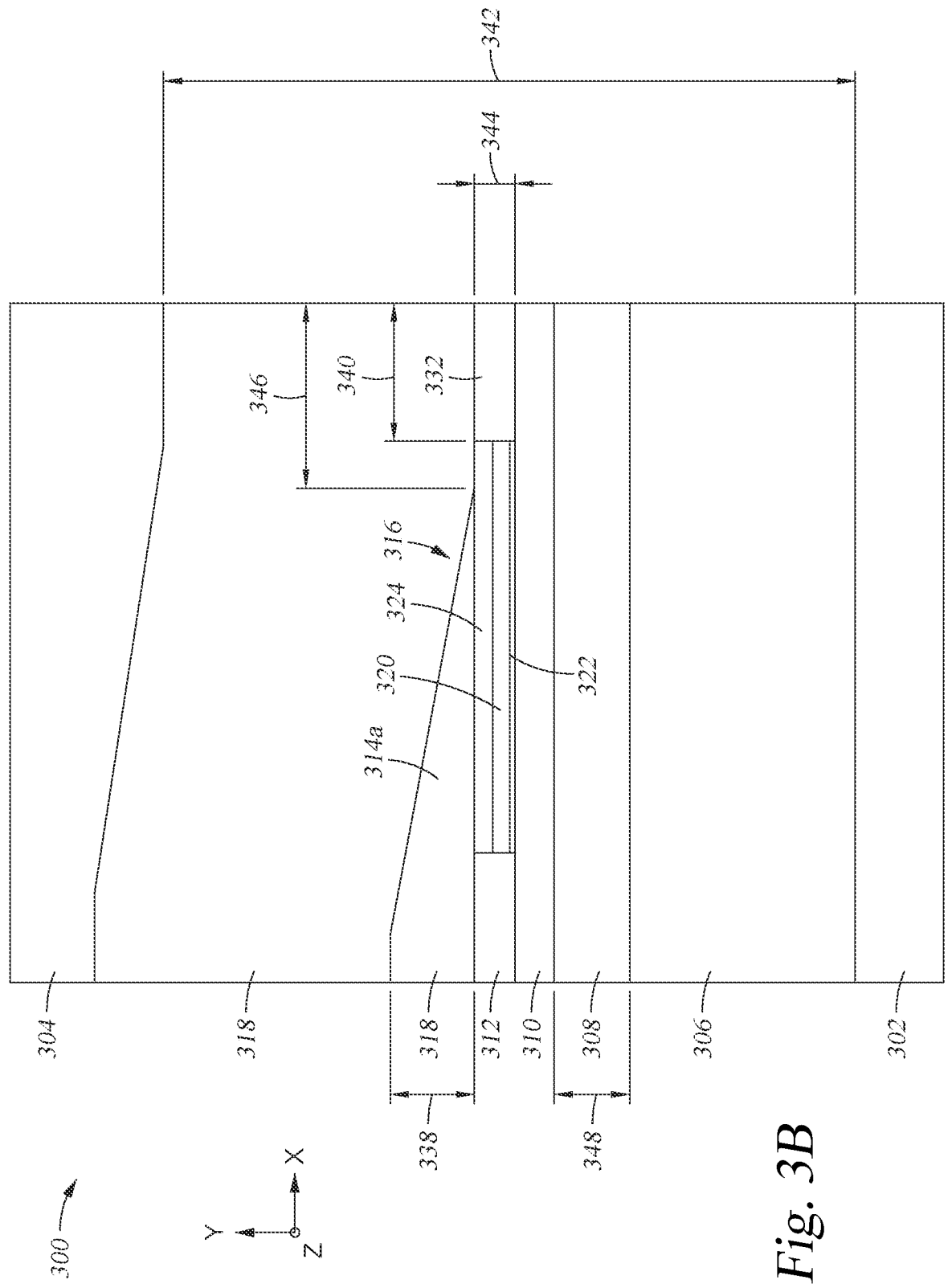

FIGS. 3A-3B illustrate cross-section views of a servo head 300 comprising a recessed magnetoresistive sensor 316, according to various embodiments. FIG. 3B is a close-up or zoomed in view of the magnetoresistive sensor 316 of FIG. 3A. The servo head 300 may be within the tape head 200 of FIG. 2, which is within a tape drive, such as the tape drive 100 of FIGS. 1A-1C. For example, the servo head 300 may be the first servo head 206A and/or the second servo head 206B of FIG. 2.

The servo head 300 comprises a first shield (S1) 302, a similar second shield (S2) 304, and a magnetoresistive sensor 316 disposed between the first shield 302 and the second shield 304. The first shield 302 is spaced a distance 342 in the y-direction of about 100 nm to about 300 nm, such as about 250 nm, from the second shield 304. The magnetoresistive sensor 316 may be any sensor susceptible to damage at the MFS of a servo head. For example, the magnetoresistive sensor 316 may be a tunneling magnetoresistive (TMR) sensor or a giant magnetoresistive (GMR) sensor. The magnetoresistive sensor 316 may be referred to as a TMR sensor 316 throughout for exemplary purposes.

A first metallic spacer layer 306 is disposed on the first shield 302, a bottom lead 308 is disposed on the first spacer layer 306, a ferromagnetic pinned layer 310 is disposed on the bottom lead 308, the magnetoresistive sensor 316 is disposed on the pinned layer 310, a top lead 314 is disposed on the magnetoresistive sensor 316, a second dielectric spacer layer 318 is disposed on the top lead 314, and the second shield 304 is disposed over the second spacer layer 318. The second dielectric spacer layer 318 enables the proper shield spacing of the first and second shields 302, 304 without electrically connecting the second shield 304 to the magnetoresistive sensor 316. The first spacer layer 306 may comprise a mechanically hard but non-magnetic conductive material, such as Ir. The second spacer layer 318 may comprise a dielectric material, such as alumina, while the first and second shields 302, 304 may each individually comprise a soft ferromagnetic metal, such as 80/20 NiFe.

As shown in FIG. 3B, the magnetoresistive sensor or TMR sensor 316 comprises a dielectric barrier layer 322, a free layer 320, and a non-magnetic cap layer 324. The functional portion of the magnetoresistive sensor or TMR sensor 316 is the free layer 320, which determines the functional dimension of the magnetoresistive sensor or TMR sensor 316. The barrier layer 322 is highly resistive relative to the metal above and below it and consumes essentially all of the power supply voltage. The barrier layer 322 is disposed on the pinned layer 310, the free layer 320 is disposed on the barrier layer 322, and the cap layer 324 is disposed in contact with the top lead 314 on the free layer 320. The magnetoresistive sensor or TMR sensor 316 has a first width 334 in the x-direction less than a second width 336 in the x-direction of the pinned layer 310.

Behind the magnetoresistive sensor or TMR sensor 316, a first dielectric layer 312, such as a refill layer, is disposed between the top lead 314 and the pinned layer 310. The bottom lead 308 comprises a first portion 308a extending from a MFS 330 into the servo head 300 and a second portion 308b recessed from the MFS 330. The first portion 308a has a greater thickness in the y-direction than the second portion 308b. A second dielectric layer 328 is disposed between the second portion 308b and the top lead 314. The first portion 308a of the bottom lead 308 has a thickness 348 in the y-direction of about 20 nm to about 40 nm, such as about 30 nm. Thus, connection of one side of a power supply 326 to the top lead 314 isolates the top lead 314, the cap layer 324, and the free layer 320 from the rest of the metal (i.e., the bottom lead 308 and the first and second shields 302, 304) in the servo head 300.

The bottom lead 308 is disposed at the MFS 330 while the top lead 314 is recessed from the MFS 330. The top lead 314 is recessed a distance 346 in the x-direction of about 30 nm to about 100 nm, such as about 70 nm, from the MFS 330. The top lead 314 comprises a first portion 314a disposed in contact with the TMR sensor 316 and a second portion 314b disposed above the first and second dielectric layers 312, 328. The first portion 314a may have a triangular shape that tapers in thickness towards the MFS 330, as the top lead 314 only needs to make adequate electrical connection to the cap layer 324 while being recessed from the MFS 330. The second portion 314b has a rectangular shape having a constant thickness. The second portion 314b of the top lead 314 has a thickness 338 in the y-direction of about 20 to about 40 nm, such as about 30 nm, to establish a low resistivity connection to the power supply 326.

As shown in FIGS. 3A-3B, the magnetoresistive sensor 316 is recessed the MFS 330 while the first shield 302, the second shield 304, the bottom lead 308, and the pinned layer 310 extend to the MFS 330. The magnetoresistive sensor 316 is recessed a distance 340 in the x-direction of about 10 nm to about 100 nm, such as about 50 nm, from the MFS 330. In some embodiments, only the free layer 320 and the cap layer 324 of the magnetoresistive sensor 316 are recessed the distance 340 from the MFS 330 while the barrier layer 322 extends to the MFS 330. A third dielectric layer 332 is disposed between the magnetoresistive sensor or TMR sensor 316 and the MFS 330, and between the second spacer layer 318 and the pinned layer 310. The third dielectric layer 332 recesses the magnetoresistive sensor or TMR sensor 316 from the MFS 330. The magnetoresistive sensor 316 and the third dielectric layer 332 each has a thickness 344 in the y-direction of about 1 nm to about 20 nm. The first, second, and third dielectric layers 312, 328, 332 may each individually comprise alumina.

The servo head 300 connects to a power supply (V) 326 or electrical circuit of the tape head through the top lead 314 and at least one pad, such as a pad 220A-220N of FIG. 2. The power supply 326 is a schematic representation only, and is not intended to be limiting. The power supply 326 may comprise numerous other electrical connections not shown, or may be connected to the servo head 300 at a different location than shown. The power supply 326 has a potential difference of several 100 mVolts. The power supply 326 is connected to the first shield 302, the second shield 304, the bottom lead 308, and the top lead 314. The power supply 326 comprises a lead resistor 325 electrically connecting the first shield 302 and the second shield 304. However, the lead resistor 325 is optional, and the first shield 302 may be directly connected to the second shield 304.

The power supply 326 is configured to apply a first electrical potential to the first shield 302, the second shield 304, and the bottom lead 308, and to apply a second electrical potential to the top lead 314. For example, the first electrical potential may be a positive potential and the second electrical potential may be a negative potential, or vice versa. Thus, the first shield 302, the second shield 304, and the bottom lead 308, which are all disposed at the MFS 330, each has the same electrical potential while the top lead 314, which is recessed from the MFS 330, has a different electrical potential. As such, only one of the two electrical potentials is exposed at the MFS 330, eliminating the possibility that a scratch will short the servo head 300. The power supply 326 is further configured to apply a voltage across the magnetoresistive sensor or TMR sensor 316.

Figure 3C:
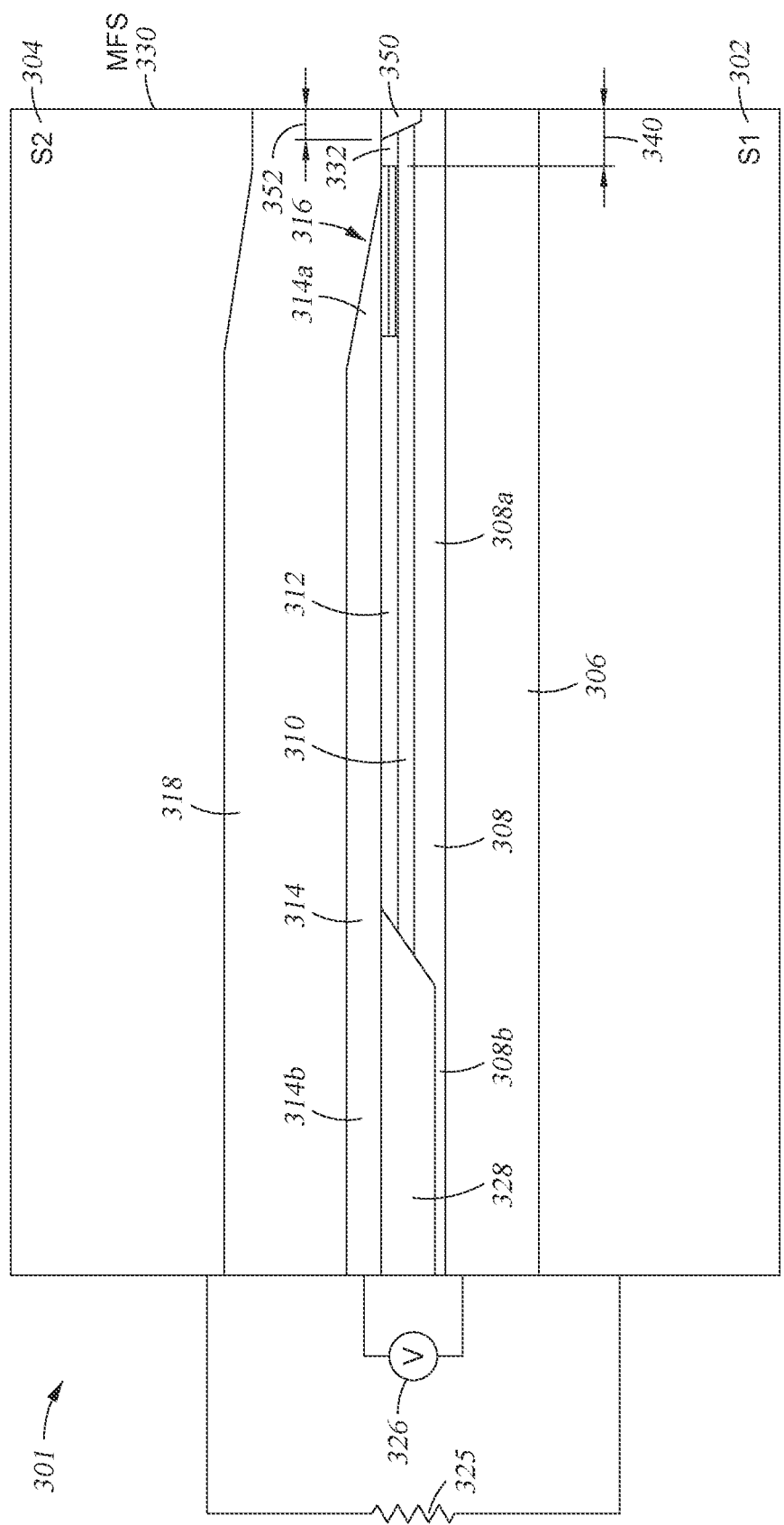
FIG. 3C illustrates a cross-section view of a servo head comprising a recessed magnetoresistive sensor, according to another embodiment.

FIG. 3C illustrates a cross-section view of a servo head 301 comprising a recessed magnetoresistive sensor or TMR sensor 316, according to another embodiment. The servo head 301 is the same as the servo head 300 of FIGS. 3A-3B; however, the pinned layer 310 is recessed a distance 352 of about 1 nm to about 90 nm from the MFS 330 by a fourth dielectric layer 350. The pinned layer 310 is recessed a distance 352 from the MFS 330 that is less than the distance 340 that the magnetoresistive sensor or TMR sensor 316 is recessed from the MFS 330. In the servo head 301, the magnetoresistive sensor or TMR sensor 316 is recessed from the MFS 330 by the third and fourth dielectric layers 332, 350. The fourth dielectric layer 350 may comprise alumina.

Figure 3D:
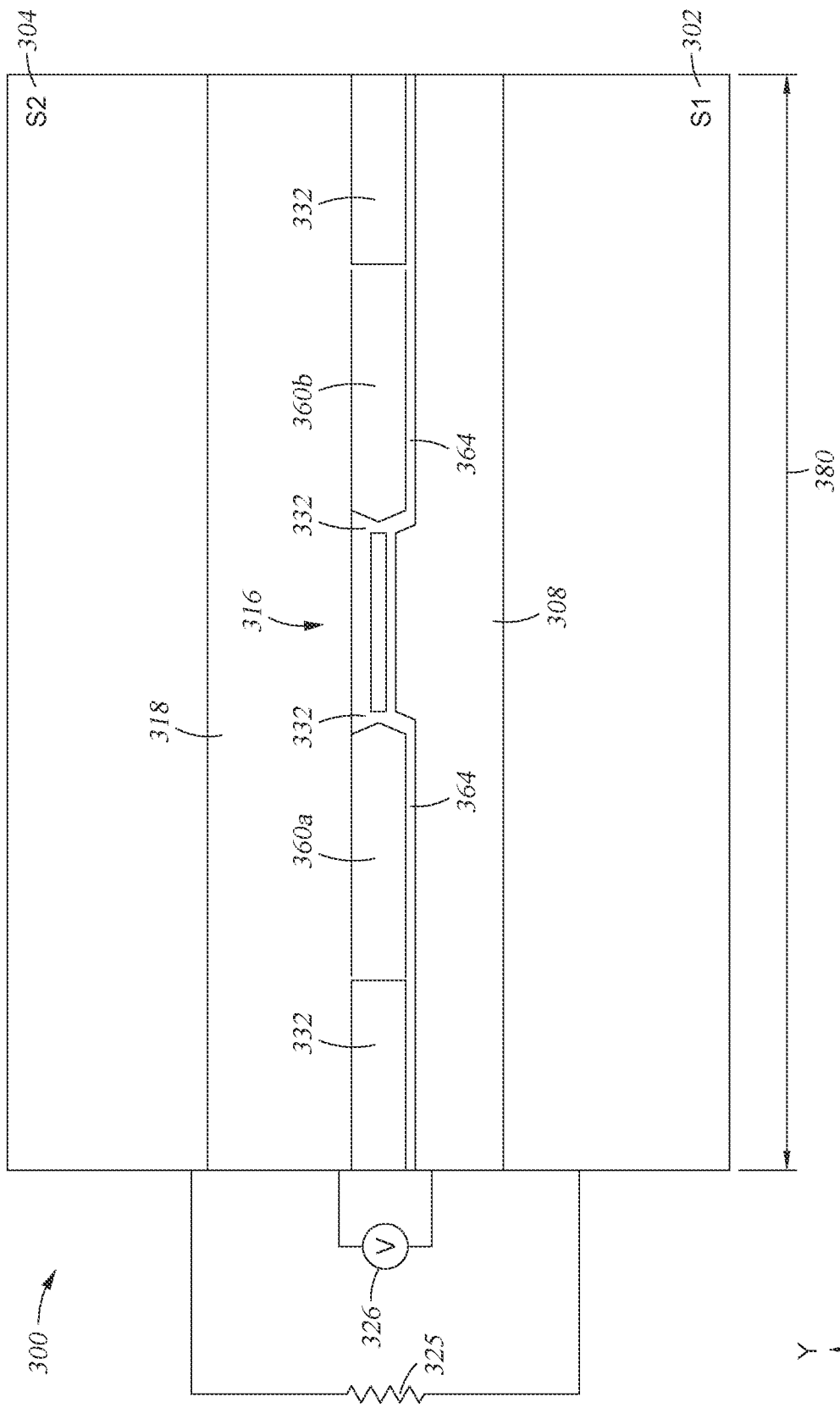
FIG. 3D illustrates a MFS view of the servo head, according to one embodiment.
Figure 3E:
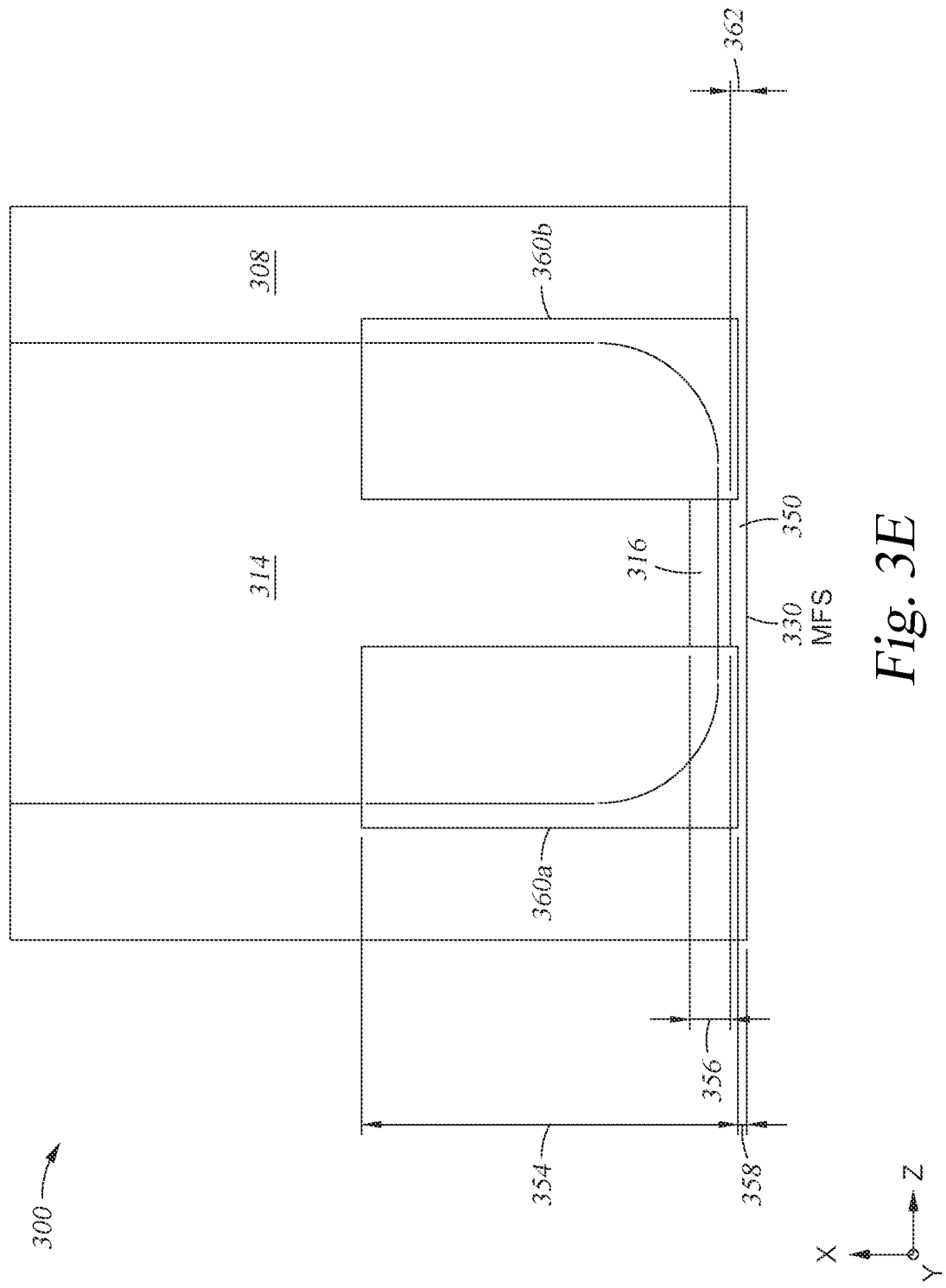
FIG. 3E illustrates a top cross-sectional view of the servo head of FIG. 3D, according to one embodiment.

FIG. 3D illustrates a MFS view of the servo head 300, according to one embodiment. FIG. 3E illustrates a top view of the servo head 300 of FIG. 3D, according to one embodiment. To show the magnetoresistive sensor or TMR sensor 316 being recessed from the MFS 330, the magnetoresistive sensor or TMR sensor 316 is depicted with dashed lines in FIG. 3D. Additionally, while the power supply 326 is illustrated in FIG. 3D, the power supply 326 is a schematic illustration only, and is not intended to be limiting. The power supply 326 may comprise numerous other electrical connections not shown, or may be connected to the servo head 300 at a different location than shown. The MFS 330 of the servo head 300 has a width 380 in the z-direction of about 500 nm to about 2500 nm.

As shown in FIGS. 3D-3E, the magnetoresistive sensor or TMR sensor 316 is disposed between a first side shield 360a and a second side shield 360b (collectively referred to as side shields 360) in the z-direction. The side shields 360 may be referred to as stabilizers. The side shields 360 are disposed over the bottom lead 308 but are isolated from the bottom lead 308 by a thin dielectric layer 364 having a thickness of about 3 nm to about 5 nm. The side shields 360 are further abutted to the cap layer 324. The side shields 360 are connected to the top lead 314 of the power supply 326, but are not connected to the bottom lead 308. The side shields 360 are electrically connected to the free layer 320 of the magnetoresistive sensor or TMR sensor 316 and are electrically isolated from the pinned layer 310. The side shields 360 are further partially disposed on and in contact with the magnetoresistive sensor or TMR sensor 316 in the y-direction. The side shields 360 provide adjacent track shielding and/or stabilization of the free layer 320 and may be either soft bias or hard bias as would be chosen by someone familiar with the technology.

The side shields 360a, 306b are disposed on both sides of the magnetoresistive sensor or TMR sensor 316 in the z-direction. The side shields 360 have a first height 354 in the x-direction greater than a height 356 of the magnetoresistive sensor or TMR sensor 316. In one embodiment, the side shields 360 may comprise a hard ferromagnetic material, such as CoCr. In another embodiment, the side shields 360 may comprise a soft bias material, such as NiFe. The side shields 360 and the magnetoresistive sensor or TMR sensor 316 are recessed from the MFS 330 in the x-direction by at least the fourth dielectric layer 350, thus preventing the hard bias with top lead 314 potential from being exposed at the MFS 330. The side shields 360 may be recessed a distance 358 by the fourth dielectric layer 350 less than the distance 340 the magnetoresistive sensor or TMR sensor 316 is recessed from the MFS 330.

The top lead 314 overlaps with the magnetoresistive sensor or TMR sensor 316, but as shown in the current embodiment, the top lead 314 can also overlap and contact the side shields 360a and 360b. As such, the width of the top lead 314 in the z-direction is not limited. However, in the embodiment shown in FIGS. 3D-3E, a length of the top lead 314 in the x-direction is limited in that the top lead 314 must be recessed from the MFS 330, as the top lead 314 is at a different potential from the other metal (e.g., the bottom lead 308 and the first and second shields 302, 304) exposed at the MFS 330. While FIGS. 3D-3E illustrate the servo head 300, the servo head 301 of FIG. 3C may be configured similarly with the recessed side shields 360a, 360b and recessed top lead 314.

Figure 3F:
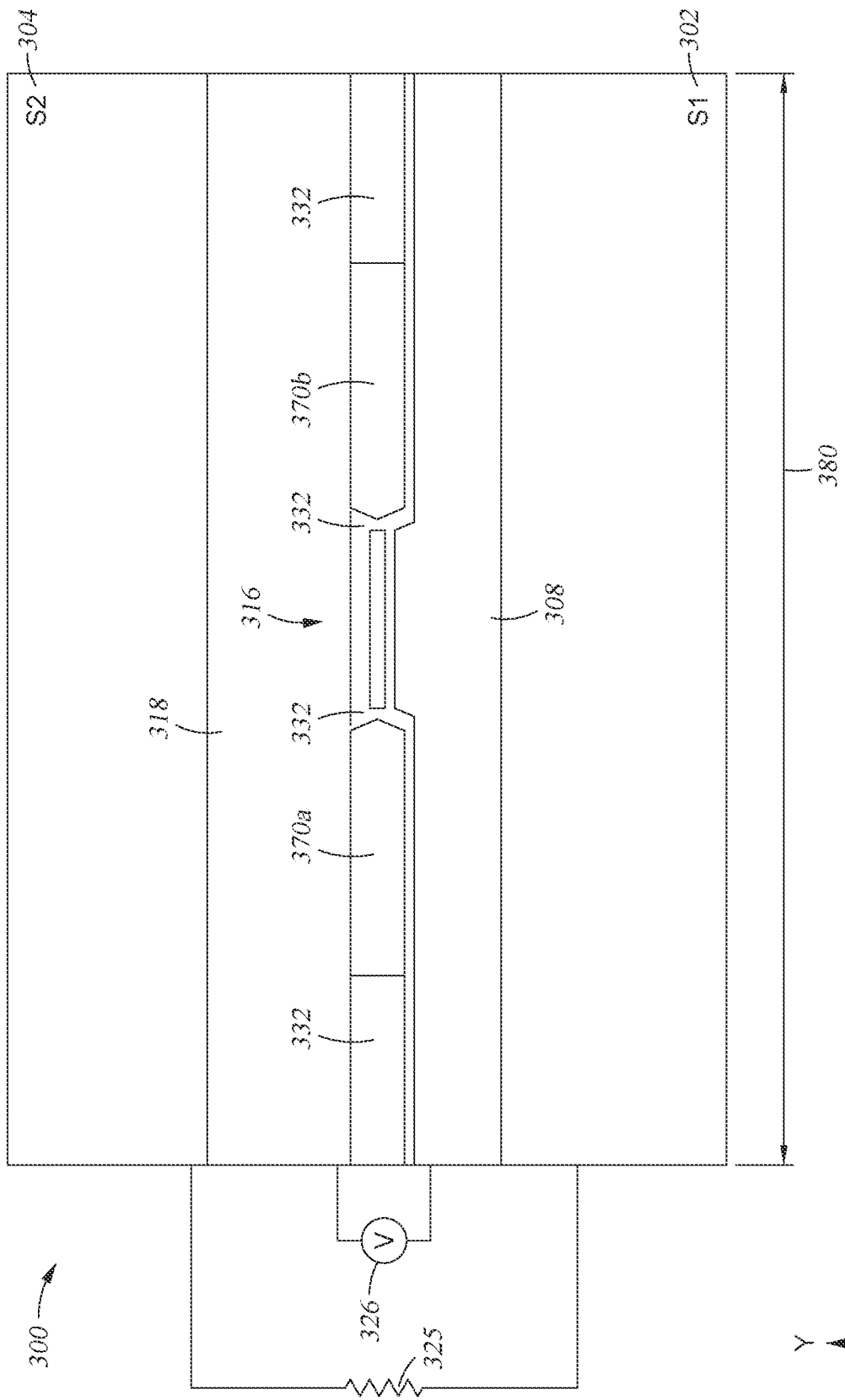
FIG. 3F illustrates a MFS view of the servo head, according to another embodiment.
Figure 3G:
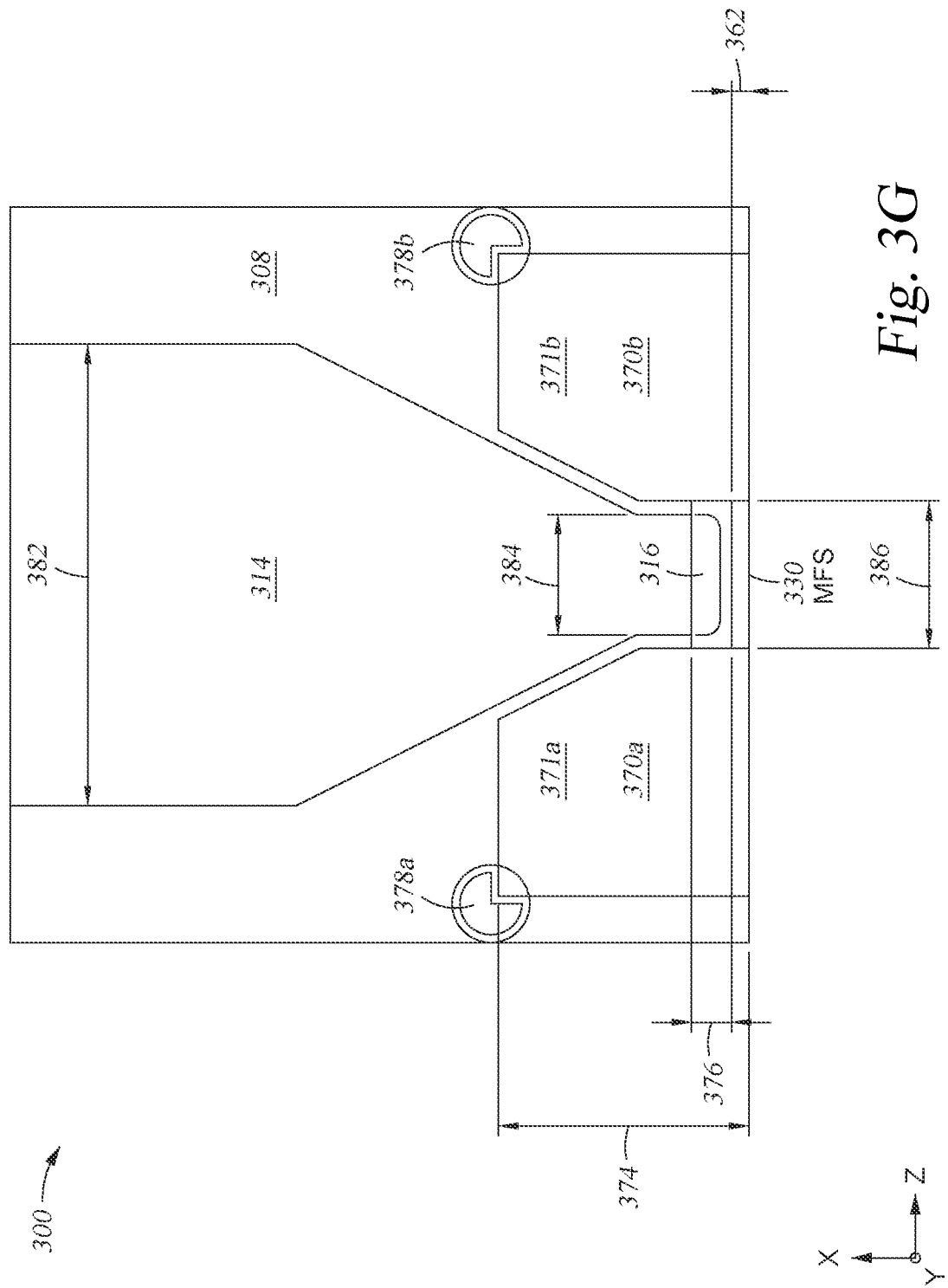
FIG. 3G illustrates a top cross-sectional view of the servo head of FIG. 3F, according to one embodiment.

FIG. 3F illustrates a MFS view of the servo head 300, according to another embodiment. FIG. 3G illustrates a top view of the servo head 300 of FIG. 3F, according to one embodiment. To show the magnetoresistive sensor or TMR sensor 316 being recessed from the MFS 330, the magnetoresistive sensor or TMR sensor 316 is depicted with dashed lines in FIG. 3F. Additionally, while the power supply 326 is illustrated in FIG. 3F, the power supply 326 is a schematic illustration only, and is not intended to be limiting. The power supply 326 may comprise numerous other electrical connections not shown, or may be connected to the servo head 300 at a different location than shown. The MFS 330 of the servo head 300 has a width 380 in the z-direction of about 1500 nm to about 2500 nm.

As shown in FIGS. 3F-3G, the magnetoresistive sensor or TMR sensor 316 is disposed between a first side shield 370a and a second side shield 370b (collectively referred to as side shields 370) in the z-direction. The side shields 370 may be referred to as stabilizers. The side shields 370 are disposed over the bottom lead 308, but are isolated or spaced from the free layer 320 by a thin isolation layer, such as the third dielectric layer 332. In this embodiment, the top lead 314 is isolated or spaced from a top surface 371a, 371b of the side shields 370a, 370b, as shown in FIG. 3G. As such, the side shields 370 are not connected to the top lead 314.

The top lead 314 has a first width 382 in the z-direction at a back location recessed from the MFS 330 and a second width 384 in the z-direction adjacent to the magnetoresistive sensor 316. The first width 382 of the top lead 314 is greater than the second width 384. Similarly, the second width 384 of the top lead 314 is narrower than a width 386 of the magnetoresistive sensor 316 in the z-direction. The third dielectric layer 332 may be disposed between the first side shield 370a and the magnetoresistive sensor 316, and between the second side shield 370b and the magnetoresistive sensor 316 such that the side shields 370 do not directly contact the magnetoresistive sensor 316. Thus, the side shields 370 are neither directly connected to the bottom lead 308 potential nor to the top lead 314 potential, but are independently floating relative to the power supply 326.

The side shields 370 are disposed on both sides of the magnetoresistive sensor or TMR sensor 316. The side shields 370 have a first height 374 in the x-direction greater than a second height 376 of the magnetoresistive sensor 316. In one embodiment, the side shields 370 may comprise a hard ferromagnetic material, such as CoCr. In another embodiment, the side shields 370 may comprise a soft bias material, such as NiFe. The side shields 370 and the magnetoresistive sensor or TMR sensor 316 are recessed from the MFS 330 in the x-direction, thus preventing the hard bias with top lead 314 potential from being exposed at the MFS 330. The side shields 370 may be recessed a distance 358 less than the distance 340 of the magnetoresistive sensor or TMR sensor 316.

In the embodiment of FIGS. 3F-3G, the side shields 370 are disposed at the MFS 330 while the magnetoresistive sensor or TMR sensor 316 is recessed from the MFS 330 in the x-direction. Although scratching of the MFS 330 by the tape or media may short the power supply 326 to the side shields 3370, the magnetoresistive sensor or TMR sensor 316 will not short. However, connecting the side shields 370 to the lower lead potential (i.e., the lead connected to the first shield 302) of the power supply 326 is prudent. Intermittent contact with the tape or media can cause transient electrical events between a floating device (i.e., the side shields 370) and the power supply 326, which may be a problem in some tape systems. Thus, it may be preferred that the first side shield 370a is connected to the bottom lead 308 through a first connection 378a, and the second side shield 370b is connected to the bottom lead 308 through a second connection 378b. The side shields 370 are electrically connected to the pinned layer 310 and are electrically isolated from the free layer 320 of the magnetoresistive sensor or TMR sensor 316. While FIGS. 3F-3G illustrate the servo head 300, the servo head 301 of FIG. 3C may be configured similarly with the side shields 370a, 370b and the top lead 314.

Figure 4A:
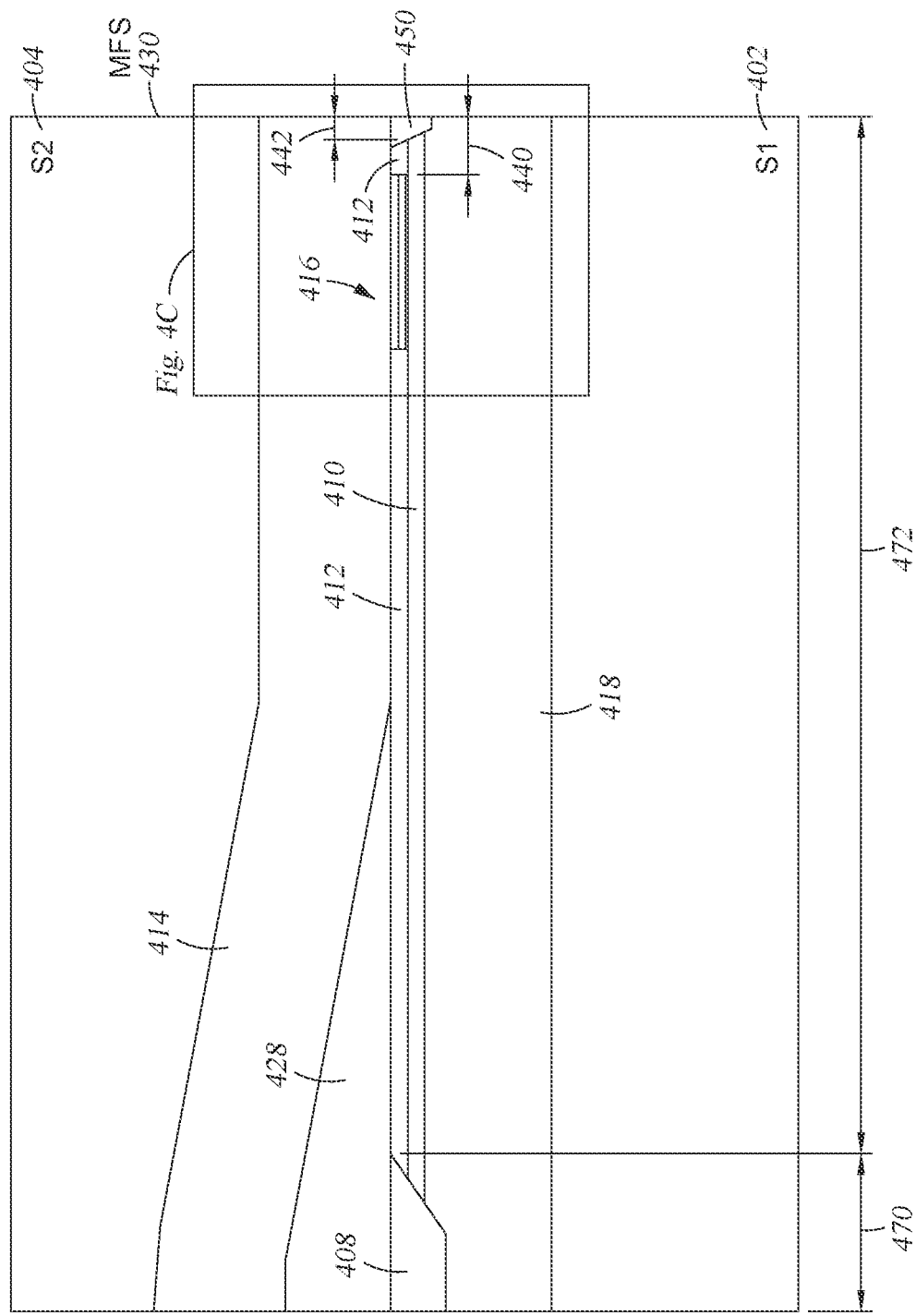
FIGS. 4A-4C illustrate a servo head comprising a recessed magnetoresistive sensor, according to various embodiments.
Figure 4B:
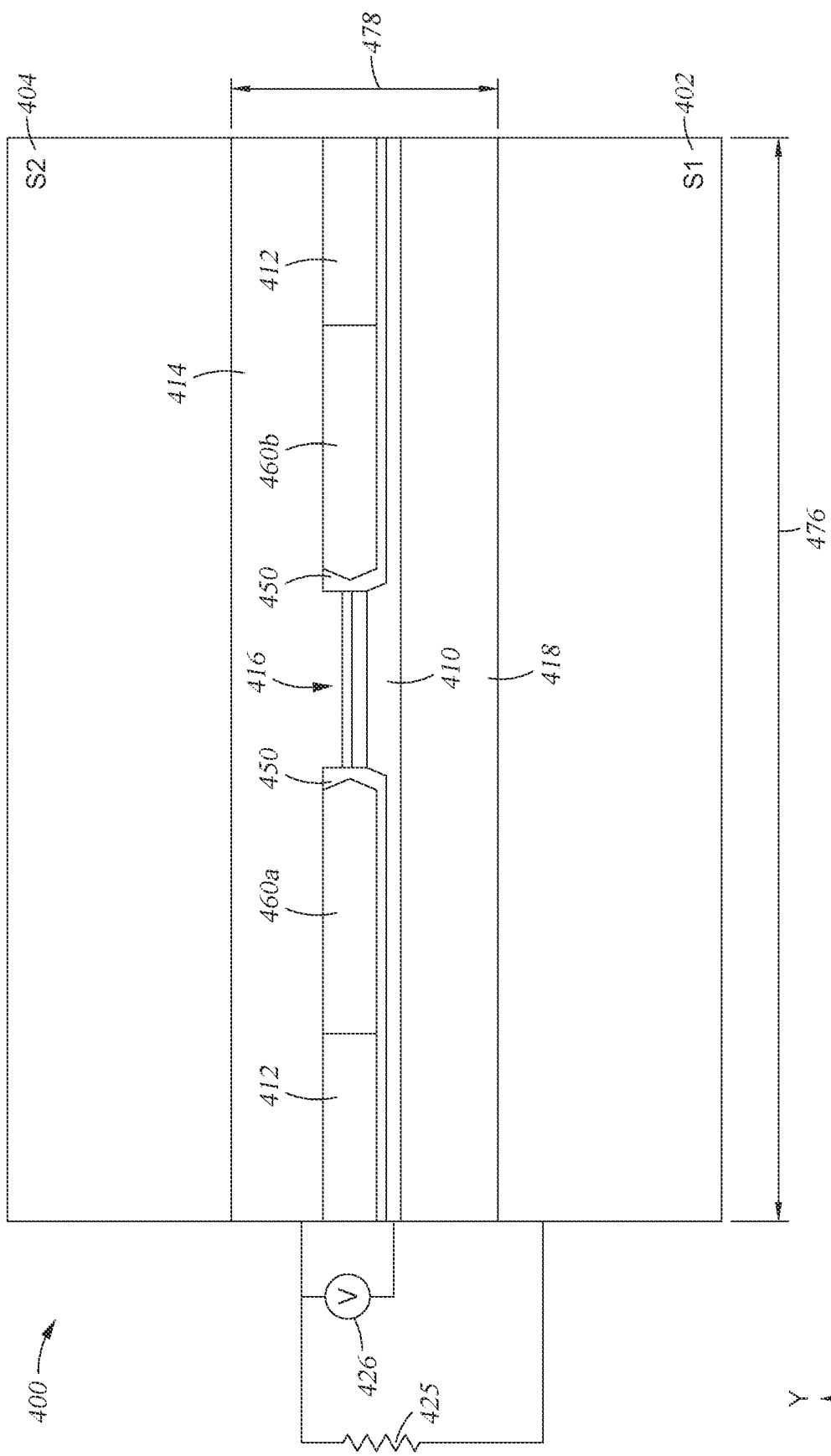
Figure 4C:
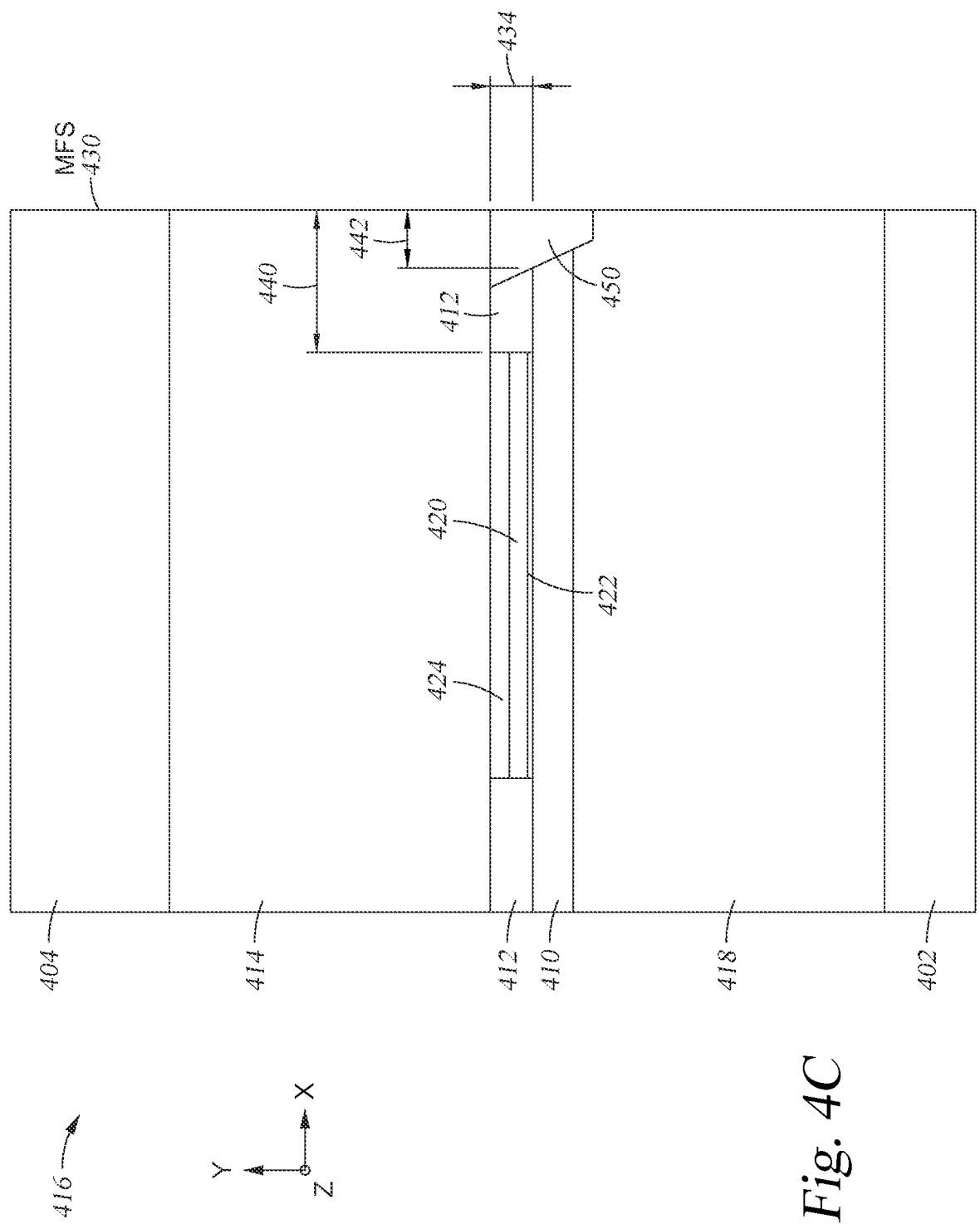

FIGS. 4A-4C illustrate a servo head 400 comprising a recessed magnetoresistive sensor 416, according to various embodiments. FIG. 4A illustrates a cross-sectional view of the servo head 400, FIG. 4B illustrates a MFS view of the servo head 400, and FIG. 4C is a close-up or zoomed in cross-sectional view of the magnetoresistive sensor 416 of FIG. 4A. The servo head 400 may be within the tape head 200 of FIG. 2, which is within a tape drive, such as the tape drive 100 of FIGS. 1A-1C. For example, the servo head 400 may be the first servo head 206A and/or the second servo head 206B of FIG. 2.

The servo head 400 is similar to the servo heads 300 and 301 of FIGS. 3A-3G; however, the magnetoresistive sensor 416 is disposed closer to the second shield 404 while the magnetoresistive sensor 316 is disposed closer to the first shield 302. The servo head 400 differs from the servo heads 300, 301 of FIGS. 3A-3G in that the servo head 400 recesses the bottom lead 408 from the MFS 430 and connects the top lead 414 to the same electrical potential as the first and second shields 402, 404. The magnetoresistive sensor 416 may be any sensor susceptible to damage at the MFS. For example, the magnetoresistive sensor 416 may be a TMR sensor or a GMR sensor. The magnetoresistive sensor 416 may be referred to as a TMR sensor 416 throughout for exemplary purposes.

The servo head 400 comprises a first shield (S1) 402, a second shield (S2) 404, and a TMR sensor 416 disposed between the first shield 402 and the second shield 404. The magnetoresistive sensor or TMR sensor 416 may be the magnetoresistive sensor or TMR sensor 316 of FIGS. 3A-3G, and the first and second shields 402, 404 may be the first and second shields 302, 304 of FIGS. 3A-3G. The first shield 402 is spaced a distance 478 in the y-direction of about 100 nm to about 300 nm, such as about 250 nm, from the second shield 404. The magnetoresistive sensor or TMR sensor 416 has a height 434 in the y-direction of about 1 nm to about 10 nm, as shown in FIG. 4C. The MFS 430 of the servo head 400 has a width 476 in the z-direction of about 500 nm to about 2500 nm.

A first spacer layer 418 is disposed on the first shield 402, a pinned layer 410 is disposed on the first spacer layer 418, a magnetoresistive sensor or TMR sensor 416 and a bottom lead 408 are connected to the pinned layer 410, and a first dielectric layer 412 is disposed on the pinned layer 410 and around the magnetoresistive sensor or TMR sensor 416. The first spacer layer 418 may comprise a non-conductive dielectric material to isolate the pinned layer 410 from the first shield 402. A top lead 414 is disposed on the first dielectric layer 412 and the magnetoresistive sensor or TMR sensor 416, and the second shield 404 is disposed over the top lead 414. The top lead 414 may comprise a non-magnetic mechanically hard, conductive metal. A second dielectric layer 428 recessed from the MFS 430 is disposed between the bottom lead 408 and the top lead 414. As such, the first shield 402, the second shield 404, and the top lead 414 are all disposed at the MFS 430 while the bottom lead 408 is recessed from the MFS 330, as discussed further below.

In the embodiment shown in FIG. 4A, the pinned layer 410 connects the magnetoresistive sensor or TMR sensor 416 to the bottom lead 408. In such an embodiment, the bottom lead 408 has a length 470 in the x-direction of about 50 nm to about 600 nm and is recessed a distance 472 of about 1000 nm from the MFS 430. The bottom lead 408 is a highly conductive lead to connect the pinned layer 410 to at least one pad, such as the pads 220A-220N of FIG. 2. However, the servo head 400 is not limited to the pinned layer 410 connecting the magnetoresistive sensor or TMR sensor 416 to the bottom lead 408, and in some embodiments, one or more connection layers, such as one or more copper layers, and/or one or more dielectric layers may be disposed between the pinned layer 410 and the bottom lead 408.

Furthermore, the bottom lead 408 is not limited to having the length 470, and in some embodiments, the length 470 may be greater, resulting in the bottom lead 408 being recessed a distance less than the distance 472 from the MFS 430 within about 50 nm of the magnetoresistive sensor 416. The position and design of the stitch (e.g., the bottom lead 408 and pinned layer 410 connection to the magnetoresistive sensor or TMR sensor 416) is chosen so that total parasitic lead resistance does not exceed the maximum parasitic lead resistance acceptable to the electronics of the tape drive from proper servo signal detection. In yet other embodiments, the bottom lead 408 may be recessed from the MFS 430 by a dielectric layer disposed between the pinned layer 410 and the first spacer layer 418.

The first spacer layer 418 may comprise a dielectric material, such as alumina, and the first and second shields 402, 404 may each individually comprise a soft ferromagnetic metal, such as 80/20 NiFe. The magnetoresistive sensor 416 is recessed a distance 440 of about 10 nm to about 100 nm from the MFS 430 by a portion of the first dielectric layer 412 and a third dielectric layer 450. The pinned layer 410 is also recessed a distance 442 of about 1 nm to about 90 nm from the MFS 430 by the third dielectric layer 450. The distance 440 the magnetoresistive sensor 416 is recessed from the MFS 430 is greater than the distance 442 the pinned layer 410 is recessed from the MFS 430. The first, second, and third dielectric layers 412, 428, 450 may each individually comprise alumina, for example.

As shown in FIG. 4C, the magnetoresistive sensor or TMR sensor 416 comprises a dielectric barrier layer 422, a free layer 420, and a non-magnetic cap layer 424. The barrier layer 422 is disposed on the pinned layer 410, and the cap layer 424 is disposed in contact with the top lead 414. The magnetoresistive sensor or TMR sensor 416 is recessed a distance 440 of about 10 nm to about 100 nm from the MFS 430 by a portion of the first dielectric layer 412 and a third dielectric layer 450. The pinned layer 410 is also recessed a distance 442 of about 1 nm to about 90 nm from the MFS 430 by the third dielectric layer 450. The distance 440 the magnetoresistive sensor or TMR sensor 416 is recessed from the MFS 430 is greater than the distance 442 the pinned layer 410 is recessed from the MFS 430. The first, second, and third dielectric layers 412, 428, 450 may each individually comprise alumina, for example.

As further shown in FIG. 4B, a first side shield 460a and a second side shield 460b (collectively referred to as side shields 460) are disposed at the MFS 430. The side shields 460 may be referred to as stabilizers. The side shields 460 are disposed adjacent to the magnetoresistive sensor or TMR sensor 416 in the z-direction. The side shields 460 are further disposed between the top lead 414 and the pinned layer 410. The side shields 460 may each comprise a hard bias material or a soft bias material. The side shields 460 may be the side shields 360 of FIG. 3E, or the side shields 370 of FIG. 3G. Moreover, the side shields 460 may be disposed in contact with the TMR sensor 416, like the side shields 360 of FIG. 3E, or the side shields 460 may be connected to the bottom lead 408 through a first connection and a second connect (not shown), like the side shields 370 of FIG. 3G. The side shields 460 are spaced from the magnetoresistive sensor or TMR sensor 416 by the third dielectric layer 450. The first dielectric layer 412 is disposed on the outer ends of each side shield 460. The pinned layer 410 is recessed from the MFS 430 by the third dielectric layer 450, as shown by the dashed lines in FIG. 4A.

The servo head 400 connects to a power supply (V) 426 or electrical circuit of the tape head through the top lead 414 and at least one pad, such as a pad 220A-220N of FIG. 2. The power supply 426 is a schematic representation only, and is not intended to be limiting. The power supply 426 may comprise numerous other electrical connections not shown, or may be connected to the servo head 400 at a different location than shown. The power supply 426 has a potential difference of several 100 mVolts. The power supply 426 is connected to the first shield 402, the top lead 414, and the bottom lead 408. The power supply 426 comprises a lead resistor 425 electrically connecting the first shield 402 and the second shield 404. However, the lead resistor 425 is optional, and the first shield 402 may be directly connected to the second shield 404.

The power supply 426 is configured to apply a first electrical potential to the first shield 402, the second shield 404, the side shields 460, and the top lead 414, and to apply a second electrical potential to the bottom lead 408. For example, the first electrical potential may be a positive potential and the second electrical potential may be a negative potential, or vice versa. Thus, the first shield 402, the second shield 404, the side shields 460, and the top lead 414, which are disposed at the MFS 430, have the same electrical potential while the bottom lead 408, which is recessed from the MFS 430, has a different potential. In some embodiments, the side shields 460 are electrically connected to the pinned layer 410 and are electrically isolated from the free layer 420 of the magnetoresistive sensor or TMR sensor 416. As such, only one of the two electrical potentials is exposed at the MFS 430, eliminating the possibility that a scratch will short the servo head 400. The power supply 426 is further configured to apply a voltage across the magnetoresistive sensor or TMR sensor 416.

By recessing the magnetoresistive sensors or TMR sensors of the servo heads of a tape head away from the MFS, the areal density of the tape drive is increased about 10 times more than conventional servo heads in that the tape drive allows thinner magnetic spacing between the tape head and the media. Additionally, recessing the magnetoresistive sensors or TMR sensors of the servo heads results in the tape heads being more durable, extending the life of the tape head up to 10 years or longer. By further recessing at least one lead from the MFS, such as either the top lead or the bottom lead, the tape head is less susceptible to shorting out due to wear and scratching at the tape-head interface while being used. Additionally, due to the electrical design of each servo head being configured such that only one electric potential is exposed at the MFS, the possibility that a scratch will short the sensor is eliminated. As such, the tape heads have an increased performance while being more reliable.

In one embodiment, a tape head comprises one or more data heads and one or more servo heads. Each servo head comprises a first shield extending to a MFS, a first lead disposed over the first shield, a pinned layer disposed over the first lead, a magnetoresistive sensor disposed over the first pinned layer, the magnetoresistive sensor being recessed from the MFS a first distance, wherein the magnetoresistive sensor comprises a free layer, a second lead disposed over the magnetoresistive sensor, a spacer layer disposed over the second lead, a second shield disposed over the spacer layer, and side shields disposed adjacent to the magnetoresistive sensor between the first lead and the second lead, wherein the side shields are electrically connected to the free layer and electrically isolated from the pinned layer.

The first distance the magnetoresistive is recessed from the MFS is about 10 nm to about 100 nm, and wherein the second shield is spaced a distance of about 100 nm to about 300 nm from the first shield. The first lead extends to the MFS and the second lead is recessed from the MFS. The second lead extends to the MFS and the first lead is recessed from the MFS. The side shields extend to the MFS. A tape drive comprises the tape head. The tape drive further comprises a power supply configured to apply a first electrical potential to the first lead, the first shield, and the second shield, and to apply a second electrical potential to the second lead, wherein the first lead extends to the MFS and the second lead is recessed from the MFS. Each servo head further comprises a power supply configured to apply a first electrical potential to the second lead, the first shield, and the second shield, and to apply a second electrical potential to the first lead, wherein the second lead extends to the MFS and the first lead is recessed from the MFS.

In another embodiment, a tape head comprises one or more data heads and one or more servo heads. Each servo head comprises a first shield extending to a MFS, a first dielectric spacer layer disposed over the first shield, a first lead disposed over the first dielectric spacer layer, the first lead extending to the MFS, wherein the first lead is connected to a power supply, a magnetoresistive sensor disposed over the first lead, the magnetoresistive sensor being recessed from the MFS a first distance, a second lead disposed over the magnetoresistive sensor, the second lead being recessed from the MFS, a second shield disposed over the second lead, the second lead connected to the power supply, and side shields disposed adjacent to the magnetoresistive sensor between the first lead and the second lead, wherein the power supply is configured to apply a first electrical potential to the first lead and to apply a second electrical potential to the second side shields and the second lead.

Each servo head further comprises a pinned layer disposed between the first lead and the magnetoresistive sensor. The magnetoresistive sensor comprises a free layer. The side shields are electrically connected to the pinned layer and electrically isolated from the free layer. The pinned layer is recessed a second distance from the MFS, the second distance being less than the first distance. The side shields are recessed a third distance from the MFS. The first distance the magnetoresistive is recessed from the MFS is about 10 nm to about 100 nm. The first distance is greater than the third distance. A tape drive comprises the tape head.

In yet another embodiment, a tape head comprises one or more data heads and one or more servo heads. Each servo head comprises a first shield extending to a MFS, a first lead disposed over the first shield, the first shield being recessed from the MFS, a TMR sensor disposed over the first lead, the TMR sensor comprising a free layer recessed from the MFS a first distance, a second lead disposed over the TMR sensor, the second lead extending to the MFS, a second shield disposed over the second lead, and side shields disposed adjacent to the TMR sensor between the first lead and the second lead. The tape head further comprises means for applying a first electrical potential to the second lead, the side shields, and the first and second shields, and for applying a second electrical potential to the first lead.

Each servo head further comprises a pinned layer disposed between the TMR sensor and the first lead, the pinned layer being recessed a second distance from the MFS less than the first distance. The first distance is about 10 nm to about 100 nm. The side shields are electrically connected to the free layer and electrically isolated from the pinned layer. The side shields and the second shield extend to the MFS. A tape drive comprises the tape head.

While the foregoing is directed to embodiments of the present disclosure, other and further embodiments of the disclosure may be devised without departing from the basic scope thereof, and the scope thereof is determined by the claims that follow.

What is claimed is:

1. A tape head, comprising:
    one or more data heads; and
    one or more servo heads, each servo head comprising:
        a first shield extending to a media facing surface (MFS);
        a first lead disposed over the first shield;
        a pinned layer disposed over the first lead;
        a magnetoresistive sensor disposed over the pinned layer, the magnetoresistive sensor being recessed from the MFS a first distance, wherein the magnetoresistive sensor comprises a free layer;
        a second lead disposed over the magnetoresistive sensor;
        a spacer layer disposed over the second lead;
        a second shield disposed over the spacer layer; and
        side shields disposed adjacent to the magnetoresistive sensor between the first lead and the second lead, wherein the side shields are electrically connected to the free layer and electrically isolated from the pinned layer.

2. The tape head of claim 1, wherein the first distance the magnetoresistive is recessed from the MFS is about 10 nm to about 100 nm, and wherein the second shield is spaced a distance of about 100 nm to about 300 nm from the first shield.

3. The tape head of claim 1, wherein the first lead extends to the MFS and the second lead is recessed from the MFS.

4. The tape head of claim 1, wherein the second lead extends to the MFS and the first lead is recessed from the MFS.

5. The tape head of claim 1, wherein the side shields extend to the MFS.

6. A tape drive comprising the tape head of claim 1.

7. The tape drive of claim 6, further comprising a power supply configured to apply a first electrical potential to the first lead, the first shield, and the second shield, and to apply a second electrical potential to the second lead, wherein the first lead extends to the MFS and the second lead is recessed from the MFS.

8. The tape head of claim 6, wherein each servo head further comprises a power supply configured to apply a first electrical potential to the second lead, the first shield, and the second shield, and to apply a second electrical potential to the first lead, wherein the second lead extends to the MFS and the first lead is recessed from the MFS.

9. A tape head, comprising:
    one or more data heads; and
    one or more servo heads, each servo head comprising:
        a first shield extending to a media facing surface (MFS);
        a first dielectric spacer layer disposed over the first shield;
        a first lead disposed over the first dielectric spacer layer, the first lead extending to the MFS, wherein the first lead is connected to a power supply;
        a magnetoresistive sensor disposed over the first lead, the magnetoresistive sensor being recessed from the MFS a first distance;
        a second lead disposed over the magnetoresistive sensor, the second lead being recessed from the MFS;
        a second shield disposed over the second lead, the second lead connected to the power supply; and
        side shields disposed adjacent to the magnetoresistive sensor between the first lead and the second lead, wherein the power supply is configured to apply a first electrical potential to the first lead and to apply a second electrical potential to the second side shields and the second lead.

10. The tape head of claim 9, wherein each servo head further comprises a pinned layer disposed between the first lead and the magnetoresistive sensor, and wherein the magnetoresistive sensor comprises a free layer.

11. The tape head of claim 10, wherein the side shields are electrically connected to the pinned layer and electrically isolated from the free layer.

12. The tape head of claim 10, wherein the pinned layer is recessed a second distance from the MFS, the second distance being less than the first distance.

13. The tape head of claim 9, wherein the side shields are recessed a third distance from the MFS.

14. The tape head of claim 13, wherein the first distance the magnetoresistive is recessed from the MFS is about 10 nm to about 100 nm, and wherein the first distance is greater than the third distance.

15. A tape drive comprising the tape head of claim 9.

16. A tape head, comprising:
    one or more data heads; and
    one or more servo heads, each servo head comprising:
        a first shield extending to a media facing surface (MFS);
        a first lead disposed over the first shield, the first lead being recessed from the MFS;
        a tunneling magnetoresistive (TMR) sensor disposed over the first lead, the TMR sensor comprising a free layer recessed from the MFS a first distance;
        a second lead disposed over the TMR sensor, the second lead extending to the MFS;
        a second shield disposed over the second lead; and
        side shields disposed adjacent to the TMR sensor between the first lead and the second lead; and
    means for applying a first electrical potential to the second lead, the side shields, and the first and second shields, and for applying a second electrical potential to the first lead.

17. The tape head of claim 16, wherein each servo head further comprises a pinned layer disposed between the TMR sensor and the first lead, the pinned layer being recessed a second distance from the MFS less than the first distance, wherein the first distance is about 10 nm to about 100 nm.

18. The tape head of claim 17, wherein the side shields are electrically connected to the free layer and electrically isolated from the pinned layer.

19. The tape head of claim 16, wherein the side shields and the second shield extend to the MFS.

20. A tape drive comprising the tape head of claim 16.

* * * * *